United States Patent
Zhu et al.

(10) Patent No.: US 12,395,205 B2
(45) Date of Patent: Aug. 19, 2025

(54) BLUETOOTH LOW ENERGY (BLE) MESH-BASED PROVISIONING CONTROL METHOD AND SYSTEM, AND ELECTRONIC DEVICE

(71) Applicant: CHENGDU AICH TECHNOLOGY CO., LTD., Sichuan (CN)

(72) Inventors: Jianjian Zhu, Chengdu (CN); Hongwei Yang, Chengdu (CN); Zhenxing Zhang, Chengdu (CN); Minjie Hu, Chengdu (CN); Ku Cheng, Chengdu (CN); Shiyu Su, Chengdu (CN); Ruiming Zhong, Chengdu (CN); Linhua Zhao, Chengdu (CN); Zhitao Wang, Sichuan (CN); Yong Huang, Chengdu (CN); Yong Liu, Chengdu (CN)

(73) Assignee: CHENGDU AICH TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/288,067

(22) PCT Filed: Apr. 27, 2023

(86) PCT No.: PCT/CN2023/091332
§ 371 (c)(1),
(2) Date: Oct. 24, 2023

(87) PCT Pub. No.: WO2024/103640
PCT Pub. Date: May 23, 2024

(65) Prior Publication Data
US 2025/0088212 A1  Mar. 13, 2025

(30) Foreign Application Priority Data
Nov. 15, 2022 (CN) .......... 202211420651.7

(51) Int. Cl.
H04B 1/7136 (2011.01)
H04W 8/00 (2009.01)
H04W 84/18 (2009.01)

(52) U.S. Cl.
CPC .......... *H04B 1/7136* (2013.01); *H04W 8/005* (2013.01); *H04W 84/18* (2013.01)

(58) Field of Classification Search
CPC ... H04W 8/005; H04B 1/7136; H04B 1/7143; H04B 2001/71362
See application file for complete search history.

(56) References Cited

U.S. PATENT DOCUMENTS

2017/0201854 A1* 7/2017 Choi ................. H04W 4/80
2018/0132092 A1* 5/2018 Choi ................. H04W 8/005
(Continued)

FOREIGN PATENT DOCUMENTS

CN   110445511 A   11/2019
CN   111010324 A    4/2020
(Continued)

OTHER PUBLICATIONS

Aug. 7, 2023 International Search Report issued in International Patent Application No. PCT/CN2023/091332.
(Continued)

*Primary Examiner* — Khanh C Tran
(74) *Attorney, Agent, or Firm* — Oliff PLC (57) ABSTRACT

A Bluetooth Low Energy (BLE) mesh-based provisioning control method and system, and an electronic device. The method includes: the provisioner completes, within one interval scheduling cycle based on a preset ratio of effective transmission time to interval, interactive transmission of at least three data packets sent by the server; during provisioning between the provisioner and the to-be-connected device, the provisioner obtains current wireless access point infor-
(Continued)

mation; the provisioner determines a target hopping channel value based on the current wireless access point information; after the to-be-connected device receives a connection request sent by the provisioner and sets the target hopping channel value as a to-be-connected device hopping value, the provisioner controls the to-be-connected device to hop at a frequency corresponding to the to-be-connected device hopping value to complete interaction of provisioning data packets.

10 Claims, 5 Drawing Sheets

(56) References Cited

U.S. PATENT DOCUMENTS

| | | | | |
|---|---|---|---|---|
| 2019/0200193 | A1* | 6/2019 | Bae | H04W 8/005 |
| 2022/0303218 | A1* | 9/2022 | Zhodzishsky | H04L 47/125 |
| 2023/0111313 | A1* | 4/2023 | Kim | H04L 45/20 |
| | | | | 370/254 |
| 2023/0135800 | A1* | 5/2023 | Zhang | H04W 12/037 |
| | | | | 726/4 |

FOREIGN PATENT DOCUMENTS

| | | |
|---|---|---|
| CN | 112332931 A | 2/2021 |
| CN | 112469014 A | 3/2021 |
| CN | 115499946 A | 12/2022 |
| WO | 2022/068670 A1 | 4/2022 |

OTHER PUBLICATIONS

Aug. 7, 2023 Written Opinion issued in International Patent Application No. PCT/CN2023/091332.

Dec. 28, 2022 Office Action issued in Chinese Patent Application No. 202211420651.7.

* cited by examiner

```
┌─────────────────────────────────────────────────────────────────┐
│ During provisioning between the server and the provisioner and/or│
│ between the provisioner and the to-be-connected device, the provisioner │ ___ 201
│ completes, within one interval scheduling cycle based on a preset ratio │
│ of effective transmission time to interval, interactive transmission of at │
│           least three data packets sent by the server           │
└─────────────────────────────────────────────────────────────────┘
                                  │
                                  ▼
┌─────────────────────────────────────────────────────────────────┐
│ During provisioning between the provisioner and the to-be-connected │ ___ 202
│ device, the provisioner obtains current wireless access point information │
└─────────────────────────────────────────────────────────────────┘
                                  │
                                  ▼
┌─────────────────────────────────────────────────────────────────┐
│ The provisioner determines wireless network frequency data based on │ ___ 203
│            the current wireless access point information         │
└─────────────────────────────────────────────────────────────────┘
                                  │
                                  ▼
┌─────────────────────────────────────────────────────────────────┐
│ The provisioner determines the target hopping channel value based on │ ___ 204
│    BLE channel spectrum distribution information and the wireless  │
│                    network frequency data                        │
└─────────────────────────────────────────────────────────────────┘
                                  │
                                  ▼
┌─────────────────────────────────────────────────────────────────┐
│ After the to-be-connected device receives a connection request sent by │
│   the provisioner and sets the target hopping channel value as a to-be- │
│   connected device hopping value, the provisioner controls the to-be- │ ___ 205
│   connected device to hop at a frequency corresponding to the to-be- │
│  connected device hopping value to complete interaction of provisioning │
│                          data packets                            │
└─────────────────────────────────────────────────────────────────┘
```

| | |
|---|---|
| 2.402 | 37 |
| 2.404 | 0 |
| 2.406 | 1 |
| 2.408 | 2 |
| 2.410 | 3 |
| 2.412 | 4 |
| 2.414 | 5 |
| 2.416 | 6 |
| 2.418 | 7 |
| 2.420 | 8 |
| 2.422 | 9 |
| 2.424 | 10 |
| 2.426 | 38 |
| 2.428 | 11 |
| 2.430 | 12 |
| 2.432 | 13 |
| 2.434 | 14 |
| 2.436 | 15 |
| 2.438 | 16 |
| 2.440 | 17 |
| 2.442 | 18 |
| 2.444 | 19 |
| 2.446 | 20 |
| 2.448 | 21 |
| 2.450 | 22 |
| 2.452 | 23 |
| 2.454 | 24 |
| 2.456 | 25 |
| 2.458 | 26 |
| 2.460 | 27 |
| 2.462 | 28 |
| 2.464 | 29 |
| 2.466 | 30 |
| 2.468 | 31 |
| 2.470 | 32 |
| 2.472 | 33 |
| 2.474 | 34 |
| 2.476 | 35 |
| 2.478 | 36 |
| 2.480 | 39 |

BLUETOOTH LOW ENERGY (BLE) MESH-BASED PROVISIONING CONTROL METHOD AND SYSTEM, AND ELECTRONIC DEVICE

CROSS REFERENCE TO RELATED APPLICATION

The present disclosure claims the priority to Chinese Patent Application No. 202211420651.7, titled "BLE MESH-BASED PROVISIONING CONTROL METHOD AND SYSTEM, AND ELECTRONIC DEVICE", filed with the China National Intellectual Property Administration (CNIPA) on Nov. 15, 2022, which is incorporated herein by reference in its entirety.

TECHNICAL FIELD

The present disclosure relates to the technical field of Bluetooth in wireless communications, and in particular, to a Bluetooth Low Energy (BLE) mesh-based provisioning control method and system, and an electronic device.

BACKGROUND

With the development of technology and the continuous improvement of modernization, the demand for communications technologies has also been increasing. The Bluetooth technology, characterized by low cost and short range, has gained popularity in the market and has become one of the widely used wireless communications technologies.

The fundamental concept of the current Bluetooth Low Energy mesh (BLE mesh) home networking method is BLE mesh networking based on the specifications of the BLE mesh protocol. Gateways and node devices need to exchange information, and nodes join the mesh network of the gateway through authentication. Nodes can join the gateway using two bearer layers: PB-GATT and PB-ADV.

If a node joins the mesh network based on PB-GATT, the node and the gateway need to establish a BLE connection. The rate and success rate of provisioning depend on the network environment at that time and the efficiency of data transmission in a BLE connection state. Currently, there is no publicly available solution specifically for PB-GATT mesh provisioning. Therefore, there is an urgent need for a method to address the slow provisioning speed and low success rate in the BLE mesh protocol.

SUMMARY

Accordingly, the present disclosure provides a BLE mesh-based provisioning control method and system, and an electronic device, to solve the problem of low provisioning speed and low success rate in the BLE mesh protocol.

In a first aspect, the present disclosure provides a BLE mesh-based provisioning control method, which is applied to a BLE mesh-based provisioning control system including a server, a provisioner, and a to-be-connected device that are sequentially connected, where the method comprises:

during provisioning between the server and the provisioner and/or between the provisioner and the to-be-connected device, completing, by the provisioner within one interval scheduling cycle based on a preset ratio of effective transmission time to interval, interactive transmission of at least three data packets sent by the server;

obtaining, by the provisioner, current wireless access point information during provisioning between the provisioner and the to-be-connected device;

determining, by the provisioner, a target hopping channel value based on the current wireless access point information; and after the to-be-connected device receives a connection request sent by the provisioner and sets the target hopping channel value as a to-be-connected device hopping value, controlling, by the provisioner, the to-be-connected device to hop at a frequency corresponding to the to-be-connected device hopping value to complete interaction of provisioning data packets.

In the case of adopting the above technical solution, in the BLE mesh-based provisioning control method provided by an embodiment of the present disclosure, during provisioning between the server and the provisioner and/or between the provisioner and the to-be-connected device, the provisioner completes, within one interval scheduling cycle based on a preset ratio of effective transmission time to interval, interactive transmission of at least three data packets sent by the server, which can increase the provisioning speed and reduce the data interaction time. During provisioning between the provisioner and the to-be-connected device, the provisioner obtains current wireless access point information. The provisioner determines a target hopping channel value based on the current wireless access point information. After the to-be-connected device receives a connection request sent by the provisioner and sets the target hopping channel value as a to-be-connected device hopping value, the provisioner controls the to-be-connected device to hop at a frequency corresponding to the to-be-connected device hopping value to complete interaction of provisioning data packets. This approach ensures that the data interaction between the provisioner and the to-be-connected device takes place on a different frequency band from a wireless local area network corresponding to the current wireless access point information, thereby significantly reducing data transmission conflicts and improving the success rate of data transmission.

In a possible implementation, said determining, by the provisioner, a target hopping channel value based on the current wireless access point information includes:

determining, by the provisioner, wireless network frequency data based on the current wireless access point information; and determining, by the provisioner, the target hopping channel value based on BLE channel spectrum distribution information and the wireless network frequency data.

In a possible implementation, said determining, by the provisioner, the target hopping channel value based on BLE channel spectrum distribution information and the wireless network frequency data includes:

determining, by the provisioner, a spectrum hopping channel set based on the BLE channel spectrum distribution information and the wireless network frequency data;

determining, by the provisioner, a set of to-be-processed hopping channels based on the spectrum hopping channel set; and determining, by the provisioner based on a correspondence between BLE frequency values and channels, a target hopping channel value corresponding to each to-be-processed hopping channel value in the set of to-be-processed hopping channels.

In a possible implementation, said determining, by the provisioner, a set of to-be-processed hopping channels based on the spectrum hopping channel set includes:

converting, by the provisioner, each spectrum hopping channel value in the spectrum hopping channel set into a BLE channel value, to obtain a BLE channel set; and determining, by the provisioner in the BLE channel set, to-be-processed hopping channel values that satisfy the correspondence between BLE frequency values and channels, to obtain the set of to-be-processed hopping channels.

In a possible implementation, said obtaining, by the provisioner, current wireless access point information during provisioning between the provisioner and the to-be-connected device includes:

during provisioning between the provisioner and the to-be-connected device, obtaining, by the provisioner, a node of the to-be-connected device, and initiating a BLE connection; and obtaining, by the provisioner, the current wireless access point information.

In a second aspect, the present disclosure provides a Bluetooth Low Energy (BLE) mesh-based provisioning control system, including a server, a provisioner, and a to-be-connected device that are sequentially connected, where during provisioning between the server and the provisioner and/or between the provisioner and the to-be-connected device, the provisioner is configured to complete, within one interval scheduling cycle based on a preset ratio of effective transmission time to interval, interactive transmission of at least three data packets sent by the server;

during provisioning between the provisioner and the to-be-connected device, the provisioner is configured to obtain current wireless access point information;

the provisioner is further configured to determine a target hopping channel value based on the current wireless access point information; and after the to-be-connected device receives a connection request sent by the provisioner and sets the target hopping channel value as a to-be-connected device hopping value, the provisioner is configured to control the to-be-connected device to hop at a frequency corresponding to the to-be-connected device hopping value to complete interaction of provisioning data packets.

In a possible implementation, the provisioner is configured to determine a target hopping channel value based on the current wireless access point information, specifically:

the provisioner is configured to determine wireless network frequency data based on the current wireless access point information; and the provisioner is further configured to determine the target hopping channel value based on BLE channel spectrum distribution information.

In a possible implementation, the provisioner is further configured to determine the target hopping channel value based on BLE channel spectrum distribution information, specifically:

the provisioner is configured to determine a spectrum hopping channel set based on the BLE channel spectrum distribution information;

the provisioner is configured to determine a set of to-be-processed hopping channels based on the spectrum hopping channel set; and the provisioner is configured to determine, based on a correspondence between BLE frequency values and channels, a target hopping channel value corresponding to each to-be-processed hopping channel value in the set of to-be-processed hopping channels.

In a possible implementation, the provisioner is configured to determine a set of to-be-processed hopping channels based on the spectrum hopping channel set, specifically:

the provisioner is configured to convert each spectrum hopping channel value in the spectrum hopping channel set into a BLE channel value, to obtain a BLE channel set; and the provisioner is configured to determine, in the BLE channel set, to-be-processed hopping channel values that satisfy the correspondence between BLE frequency values and channels, to obtain the set of to-be-processed hopping channels.

In a possible implementation, the provisioner is configured to obtain current wireless access point information during provisioning between the provisioner and the to-be-connected device, specifically:

during provisioning between the provisioner and the to-be-connected device, the provisioner is configured to obtain a node of the to-be-connected device, and initiate a BLE connection; and the provisioner is configured to obtain the current wireless access point information.

The beneficial effects of the BLE mesh-based provisioning control system provided in the second aspect are the same as those of the BLE mesh-based provisioning control method provided in the first aspect, and will not be elaborated here.

In a third aspect, the present disclosure provides an electronic device, including one or more processors, and one or more machine-readable media storing instructions, where when the instructions are executed by the one or more processors, an apparatus is caused to perform any possible implementation of the BLE mesh-based provisioning control method described in the first aspect.

The beneficial effects of the electronic device provided in the third aspect are the same as those of the BLE mesh-based provisioning control method provided in the first aspect, and will not be elaborated here.

BRIEF DESCRIPTION OF THE DRAWINGS

In order to illustrate the technical solutions in the embodiments of the present disclosure or in the prior art more clearly, the accompanying drawings required in the description of the embodiments or the prior art will be described below.

REFERENCE NUMERALS

01: server; 02: provisioner; 03: to-be-connected device; 021: wireless module; 022: BLE module; 300: electronic device; 310: processor; 320: communication interface; 330: memory; 340: communication link; 400: chip; 410: bus system.

DETAILED DESCRIPTION OF THE EMBODIMENTS

Figure 1:
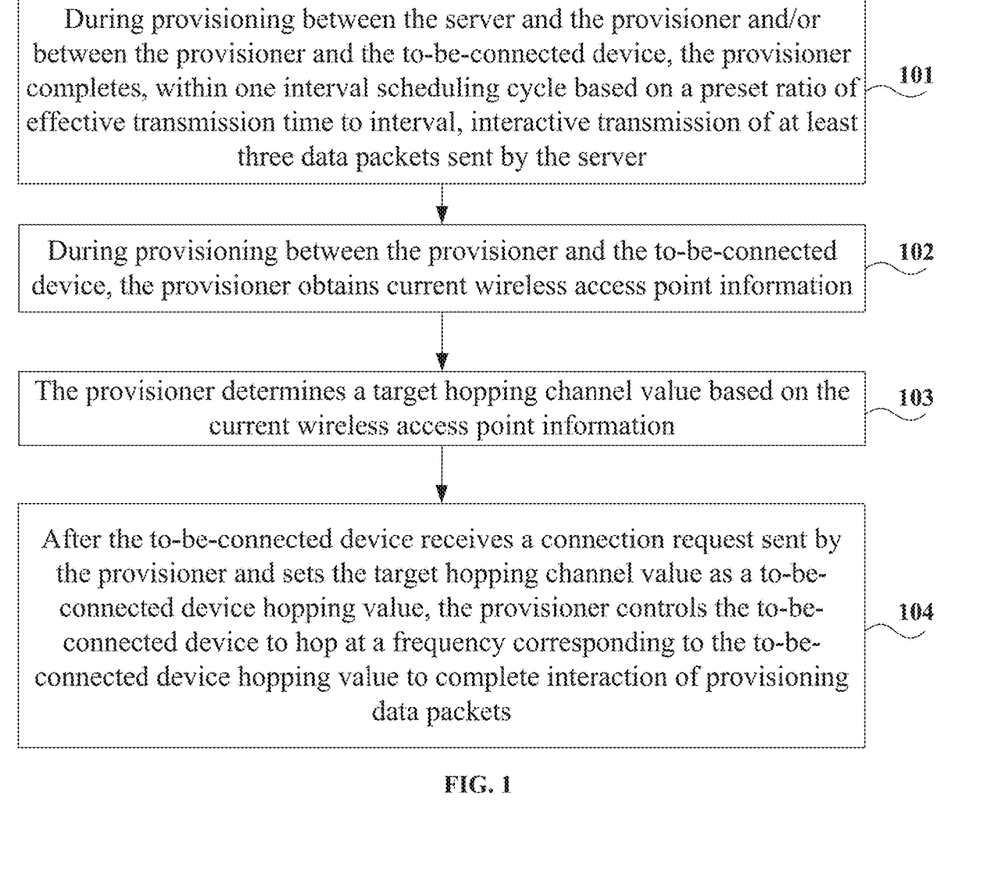
FIG. 1 is a schematic flowchart of a BLE mesh-based provisioning control method according to an embodiment of the present disclosure.

The core of the present disclosure is to provide a BLE mesh-based provisioning control method according to an embodiment of the present disclosure. FIG. 1 is a schematic flowchart of a BLE mesh-based provisioning control method according to an embodiment of the present disclosure. The method is applied to a BLE mesh-based provisioning control system, where the system includes a server, a provisioner, and a to-be-connected device that are sequentially connected. As shown in FIG. 1, the BLE mesh-based provisioning control method includes the following steps:

Step 101: During provisioning between the server and the provisioner and/or between the provisioner and the to-be-connected device, the provisioner completes, within one interval scheduling cycle based on a preset ratio of effective transmission time to interval, interactive transmission of at least three data packets sent by the server.

Figure 2:
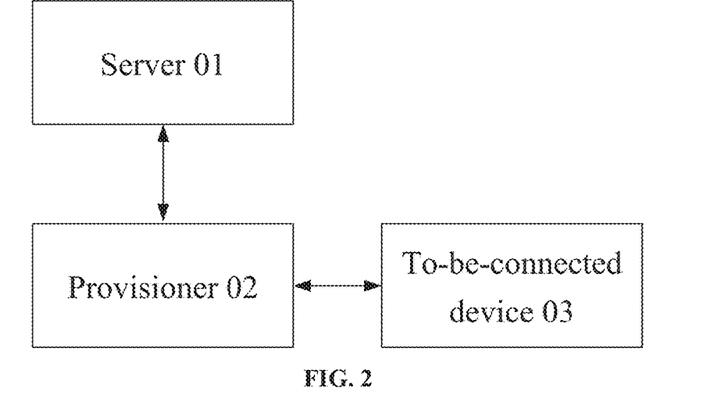
FIG. 2 is a schematic structural diagram of a BLE mesh-based provisioning control system according to an embodiment of the present disclosure.

FIG. 2 is a schematic structural diagram of a BLE mesh-based provisioning control system according to an embodiment of the present disclosure. As shown in FIG. 2, the system includes a server 01, a provisioner 02, and a to-be-connected device 03 that are sequentially connected. FIG. 2 shows a provisioning framework of BLE mesh with PB-GATT as a bearer layer. In the present disclosure, mesh provisioning server interaction is performed between the server (service) 01 and the provisioner (provisioner) 02. The provisioner 02 establishes a BLE connection, performs device authentication, and exchanges provisioning information with the to-be-connected device (node) 03, and then the BLE connection is terminated. The provisioner 02 interacts with the server 01 over the network, and the server 01 participates in the entire provisioning process. The provisioning includes processes such as device authentication, public key (publickey) delivery, network key (netkey) delivery, unicast address (unicast addr) allocation, device key (devkey) storage, and application key (appkey) delivery.

The provisioner 02 interacts with the server 01 to exchange provisioning information and interacts with the to-be-connected device 03, such that the to-be-connected device 03 joins the mesh network. The provisioner 02 can control attribute states of the to-be-connected device node, such as controlling a light to turn on/off, and controlling the brightness and color temperature of the light, through voice or an electronic device such as a mobile phone.

It should be noted that the application scenario of BLE mesh networking involves using a gateway to add a BLE mesh node device to a mesh network through a BLE connection. The gateway can be considered as a Bluetooth device with mesh provisioning functionality. The gateway can be an electronic device such as a Bluetooth speaker or a mobile phone, which is not specifically limited in the embodiments of the present disclosure. The BLE mesh node device generally can be a device that joins a mesh gateway network by using PB-ADV or PB-GATT as a bearer layer.

The mesh gateway can control devices of a mesh node, such as BLE mesh or a BLE mesh air conditioner, which is not specifically limited in the embodiments of the present disclosure. Adjustments can be made based on practical application scenarios.

The present disclosure mainly focuses on optimizing the BLE provisioning speed and provisioning success rate of the PB-GATT provisioning method. The optimization primarily revolves around the provisioner. During provisioning between the server and the provisioner, and/or between the provisioner and the to-be-connected device, the provisioner completes, within one interval scheduling cycle based on a preset ratio of effective transmission time to interval, the interactive transmission of at least three data packets sent by the server. In the present disclosure, a relatively high ratio of effective transmission time to interval (windows/interval) can be set. The specific value of the ratio of effective transmission time to interval is not limited in the present disclosure. Interactive transmission of a plurality of data packets needs to be completed within one interval scheduling cycle.

It should be noted that, when the server and the provisioner exit the provisioning process, and/or the provisioner and the to-be-connected device exit the provisioning process, a historical ratio of effective transmission time to interval can be restored. The historical ratio of effective transmission time to interval is lower than the current ratio of effective transmission time to interval.

Figure 3:
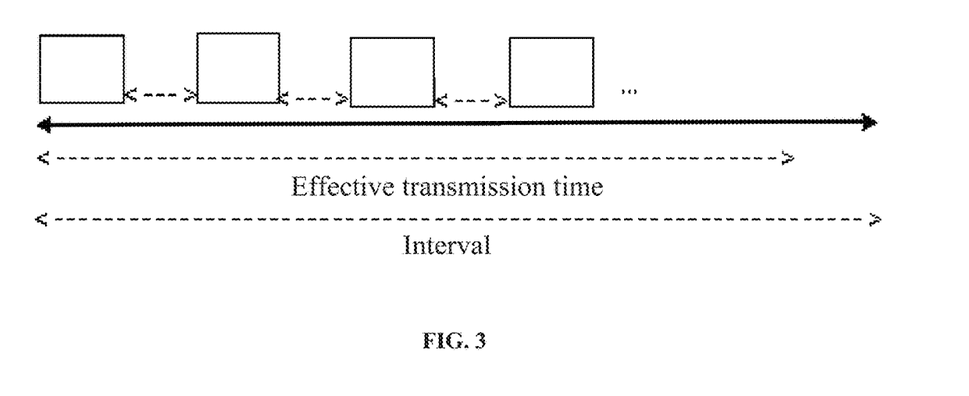
FIG. 3 is a schematic diagram illustrating interactive transmission of a plurality of data packets accomplished using a ratio of effective transmission time to interval according to an embodiment of the present disclosure.

FIG. 3 is a schematic diagram illustrating interactive transmission of a plurality of data packets accomplished using a ratio of effective transmission time to interval according to an embodiment of the present disclosure. As shown in FIG. 3, within one interval scheduling cycle with the ratio of effective transmission time to interval in the present disclosure, interactive transmission of a plurality of data packets can be accomplished. This can improve the provisioning speed and avoid wasting idle resources within the interval.

Step 102: During provisioning between the provisioner and the to-be-connected device, the provisioner obtains current wireless access point information.

In the present disclosure, during provisioning between the provisioner and the to-be-connected device, the provisioner can obtain node information of the to-be-connected device. The provisioner obtains the current wireless access point information and initiates a BLE connection.

Figure 4:
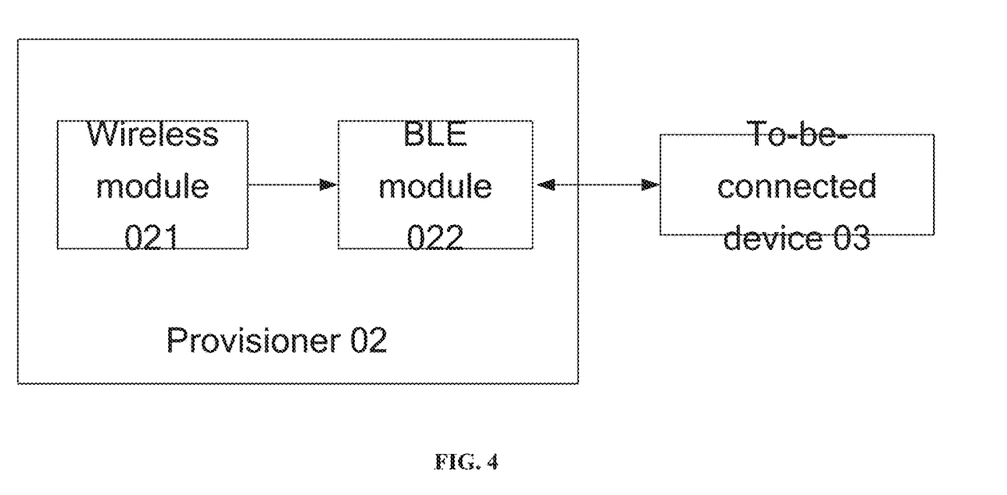
FIG. 4 is a schematic diagram of interaction between a provisioner and a to-be-connected device according to an embodiment of the present disclosure.

FIG. 4 is a schematic diagram of interaction between a provisioner and a to-be-connected device according to an embodiment of the present disclosure. As shown in FIG. 4, the provisioner 02 includes a wireless module 021 and a BLE module 022 connected to each other. The BLE module 022 is connected to the to-be-connected device 03. In the present disclosure, after being connected to a corresponding channel, the wireless module 021 can send, to the BLE module 022, information about a wireless access point (AP) connected to the wireless module 021. The wireless module 021 can write the wireless access point information into a corresponding register. The BLE module 022 can read the corresponding register before establishing a BLE connection, so as to obtain the corresponding current wireless access point information.

Step 103: The provisioner determines a target hopping channel value based on the current wireless access point information.

In the present disclosure, the provisioner can determine wireless network frequency data based on the current wireless access point information. The provisioner determines the target hopping channel value based on BLE channel spectrum distribution information and the wireless network frequency data.

Step 104: After the to-be-connected device receives a connection request sent by the provisioner and sets the target hopping channel value as a to-be-connected device hopping value, the provisioner controls the to-be-connected device to hop at a frequency corresponding to the to-be-connected device hopping value to complete interaction of provisioning data packets.

In the present disclosure, referring to FIG. 4, when the BLE module 022 in the provisioner 02 establishes the BLE connection with the to-be-connected device 03, the provisioner can configure hopping channel content in the connection request. In the hopping channel, the target hopping channel value corresponding to the current wireless access point information can be configured as unavailable. After the to-be-connected device receives the connection request, the target hopping channel value can be set as the to-be-connected device hopping value. During the entire mesh provisioning phase, data interaction can be conducted while avoiding the target hopping channel of the current wireless access point corresponding to the wireless module. The BLE data transmission remains unaffected by interference from the wireless network of the current AP, significantly reducing data retransmission, thereby increasing the provisioning success rate and the provisioning speed.

In summary, in the BLE mesh-based provisioning control method provided by this embodiment of the present disclosure, during provisioning between the server and the provisioner and/or between the provisioner and the to-be-connected device, the provisioner completes, within one interval scheduling cycle based on a preset ratio of effective transmission time to interval, interactive transmission of at least three data packets sent by the server, which can increase the provisioning speed and reduce the data interaction time. During provisioning between the provisioner and the to-be-connected device, the provisioner obtains current wireless access point information. The provisioner determines a target hopping channel value based on the current wireless access point information. After the to-be-connected device receives a connection request sent by the provisioner and sets the target hopping channel value as a to-be-connected device hopping value, the provisioner controls the to-be-connected device to hop at a frequency corresponding to the to-be-connected device hopping value to complete interaction of provisioning data packets. This approach ensures that the data interaction between the provisioner and the to-be-connected device takes place on a different frequency band from a wireless local area network corresponding to the current wireless access point information, thereby significantly reducing data transmission conflicts and improving the success rate of data transmission.

Figure 5:
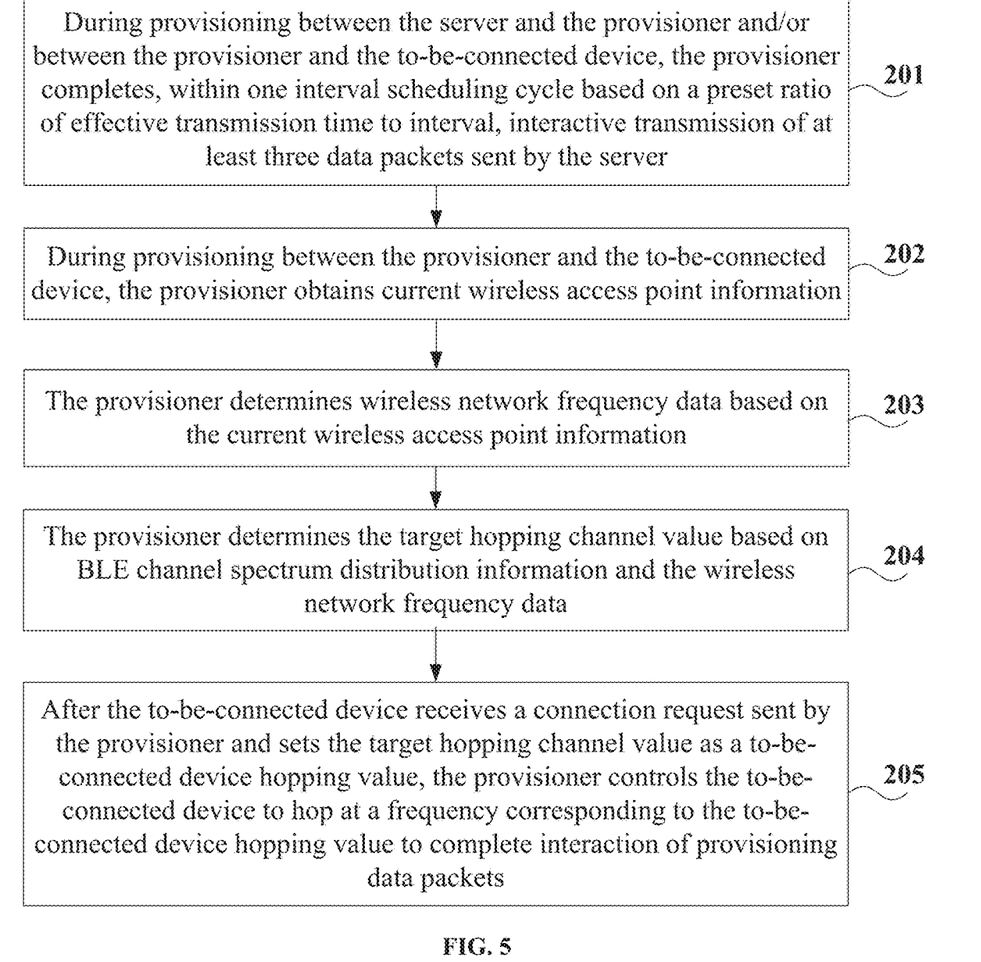
FIG. 5 is a schematic flowchart of another BLE mesh-based provisioning control method according to an embodiment of the present disclosure.

FIG. 5 is a schematic flowchart of another BLE mesh-based provisioning control method according to an embodiment of the present disclosure. The method is applied to a BLE mesh-based provisioning control system, where the system includes a server, a provisioner, and a to-be-connected device that are sequentially connected. As shown in FIG. 5, the BLE mesh-based provisioning control method includes the following steps:

Step 201: During provisioning between the server and the provisioner and/or between the provisioner and the to-be-connected device, the provisioner completes, within one interval scheduling cycle based on a preset ratio of effective transmission time to interval, interactive transmission of at least three data packets sent by the server.

FIG. 2 is a schematic structural diagram of a BLE mesh-based provisioning control system according to an embodiment of the present disclosure. As shown in FIG. 2, the system includes a server 01, a provisioner 02, and a to-be-connected device 03 that are sequentially connected. FIG. 2 shows a provisioning framework of BLE mesh with PB-GATT as a bearer layer. In the present disclosure, mesh provisioning server interaction is performed between the server (service) 01 and the provisioner (provisioner) 02. The provisioner 02 establishes a BLE connection, performs device authentication, and exchanges provisioning information with the to-be-connected device (node) 03, and then the BLE connection is terminated. The provisioner 02 interacts with the server 01 over the network, and the server 01 participates in the entire provisioning process. The provisioning includes processes such as device authentication, public key (publickey) delivery, network key (netkey) delivery, unicast address (unicast addr) allocation, device key (devkey) storage, and application key (appkey) delivery.

The provisioner 02 interacts with the server 01 to exchange provisioning information and interacts with the to-be-connected device 03, such that the to-be-connected device 03 joins the mesh network. The provisioner 02 can control attribute states of the to-be-connected device node, such as controlling a light to turn on/off, and controlling the brightness and color temperature of the light, through voice or an electronic device such as a mobile phone.

It should be noted that the application scenario of BLE mesh networking involves using a gateway to add a BLE mesh node device to a mesh network through a BLE connection. The gateway can be considered as a Bluetooth device with mesh provisioning functionality. The gateway can be an electronic device such as a Bluetooth speaker or a mobile phone, which is not specifically limited in the embodiments of the present disclosure. The BLE mesh node device generally can be a device that joins a mesh gateway network by using PB-ADV or PB-GATT as a bearer layer. The mesh gateway can control devices of a mesh node, such as BLE mesh or a BLE mesh air conditioner, which is not specifically limited in the embodiments of the present disclosure. Adjustments can be made based on practical application scenarios.

The present disclosure mainly focuses on optimizing the BLE provisioning speed and provisioning success rate of the PB-GATT provisioning method. The optimization primarily revolves around the provisioner. During provisioning between the server and the provisioner, and/or between the provisioner and the to-be-connected device, the provisioner completes, within one interval scheduling cycle based on a preset ratio of effective transmission time to interval, the interactive transmission of at least three data packets sent by the server. In the present disclosure, a relatively high ratio of effective transmission time to interval (windows/interval) can be set, where windows represent an effective data transmission time within each connection period. The specific value of the ratio of effective transmission time to interval is not limited in the present disclosure. The ratio of windows/interval is made as high as possible, to complete interactive transmission of a plurality of data packet within one interval scheduling cycle.

It should be noted that, when the server and the provisioner exit the provisioning process, and/or the provisioner and the to-be-connected device exit the provisioning process, a historical ratio of effective transmission time to interval can be restored. The historical ratio of effective transmission time to interval is lower than the current ratio of effective transmission time to interval.

FIG. 3 is a schematic diagram illustrating interactive transmission of a plurality of data packets accomplished using a ratio of effective transmission time to interval according to an embodiment of the present disclosure. As shown in FIG. 3, within one interval scheduling cycle with the ratio of effective transmission time to interval in the present disclosure, interactive transmission of a plurality of data packets can be accomplished, which can improve the provisioning speed. No idle resource within the interval is wasted, thereby further improving the provisioning speed.

Currently, traditional mesh provisioning typically requires server participation throughout the provisioning process. Each packet interaction also involves the interaction between the server and the provisioner. The provisioner obtains packets from the server and then performs provisioning interaction with the to-be-connected device. Mesh provisioning involves the exchange of information such as a public key (Publickey), a network key (netkey), authentication information, triplets information, and a unicast address (unicast addr) packet.

In a default BLE connection state, the effective transmission time is 2.5 milliseconds (ms), and the interval is 30 ms. For BLE 4.2 provisioning data packets, a maximum packet size includes 248 bits. However, in BLE 4.2, a packet can transmit 17 bytes of effective data. In accordance with the traditional, non-optimized ratio of effective transmission time to interval (windows/interval), there are 17 effective bytes transmitted in each interval. It takes 12 intervals to complete the transmission of the maximum data packet, which adds up to a total time of 30 ms*12=360 ms. Described above is the transmission process of just one packet in the BLE mesh provisioning process. Throughout the provisioning process, various packets are exchanged. The entire mesh provisioning process generally involves exchange of about 10 to 15 packets, taking approximately 4 to 6 seconds. Adding the interaction time for packets of the server and the wireless local area network and other factors, the entire mesh provisioning process roughly requires more than 10 seconds.

In the present disclosure, the effective transmission time in the BLE connection state is 27 ms, with an interval of 30 ms, and the maximum packet size is 200 bytes. Within one connection interval, which is equivalent to one interval scheduling cycle, the transmission of a 200-byte packet can be completed, requiring only 30 ms. This approach saves 330 ms of time. The entire mesh provisioning sequence, which includes approximately interaction of 10 to 15 packets, requires a transmission time of only 300 to 450 ms, saving 3 to 5 seconds. Considering the interaction between the wireless local area network (wireless module) and the server, the entire provisioning process only requires 4 to 6 seconds approximately.

Step 202: During provisioning between the provisioner and the to-be-connected device, the provisioner obtains current wireless access point information.

In the present disclosure, during provisioning between the provisioner and the to-be-connected device, the provisioner can obtain a node of the to-be-connected device and initiates a BLE connection. The provisioner obtains the current wireless access point information.

FIG. 4 is a schematic diagram of interaction between a provisioner and a to-be-connected device according to an embodiment of the present disclosure. As shown in FIG. 4, the provisioner 02 includes a wireless module 021 and a BLE module 022 connected to each other. The BLE module 022 is connected to the to-be-connected device 03. In the present disclosure, after being connected to a corresponding channel, the wireless module 021 can send, to the BLE module 022, information about a wireless access point (AP) connected to the wireless module 021. The wireless module 021 can write the wireless access point information into a corresponding register. The BLE module 022 can read the corresponding register before establishing a BLE connection, so as to obtain the corresponding current wireless access point information.

Step 203: The provisioner determines wireless network frequency data based on the current wireless access point information.

Figure 6:
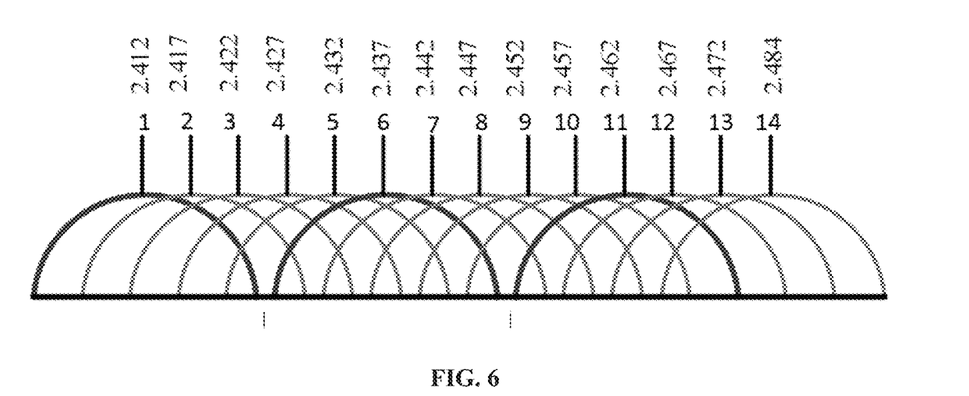
FIG. 6 is a schematic diagram of channel distribution of a wireless module according to an embodiment of the present disclosure.
Figure 7:
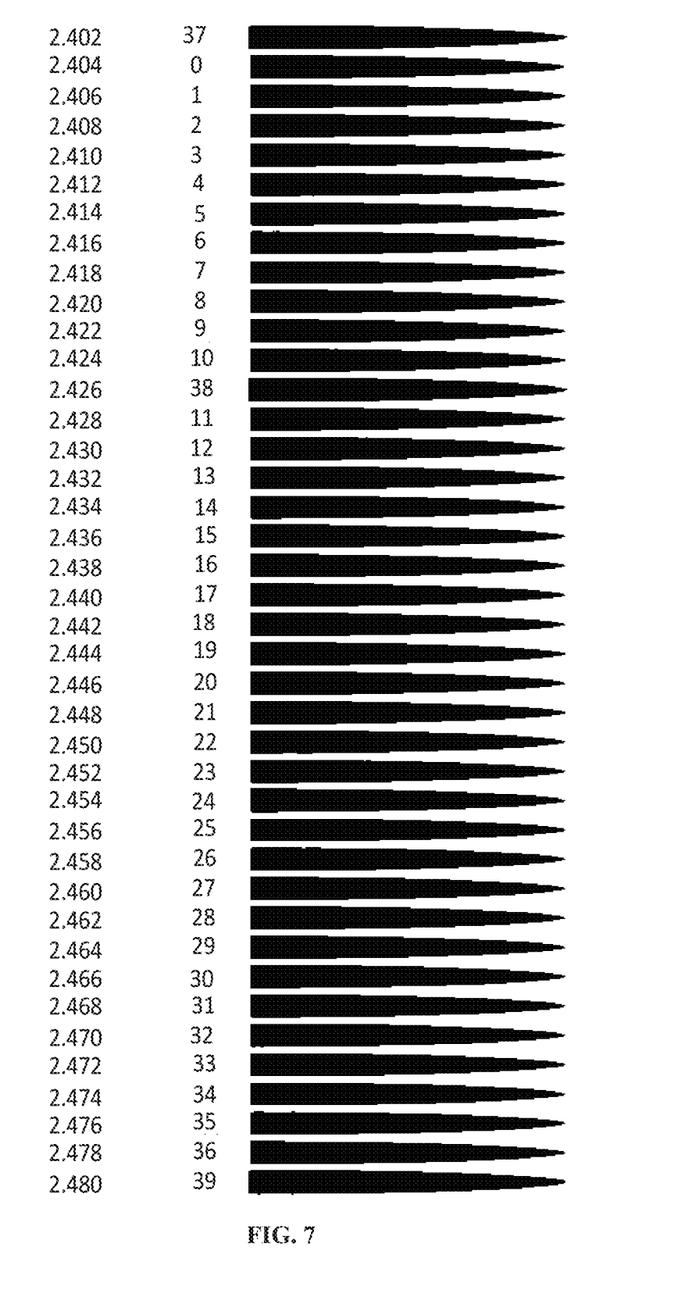
FIG. 7 is a schematic diagram of channel distribution of a BLE module according to an embodiment of the present disclosure.

In the present disclosure, FIG. 6 is a schematic diagram of channel distribution of a wireless module according to an embodiment of the present disclosure; and FIG. 7 is a schematic diagram of channel distribution of a BLE module according to an embodiment of the present disclosure. It can be learned from FIG. 6 and FIG. 7 that, the 2.4 GHz channel of the wireless module (wifi) operates within the range of 2.300 to 2.495 GHz, while the Bluetooth 2.4 GHz channel operates within the range of 2.300 to 2.4800 GHz. All channels of the BLE module share frequencies with the wireless local area network.

For example, assuming that the wireless module operates on channel 6, in this case, the BLE module needs to avoid channels on 2.427 to 2.447 GHz. First, the wireless module of the provisioner connects to the wireless access point (AP) corresponding to the current wireless access point information by using channel 6. The wireless module can set a register value to 6. Further, at the beginning of the provisioning process, the provisioner scans the node of the to-be-connected device, and then starts to establish a connection with the BLE module. Before sending the connection request, the BLE module reads the register to obtain the value of 6, and calculates the frequency corresponding to the wireless module, which is 2.427 to 2.477. That is, the wireless network frequency data is 2.427 to 2.477.

Step 204: The provisioner determines the target hopping channel value based on BLE channel spectrum distribution information and the wireless network frequency data.

In the present disclosure, the specific implementation process of step 204 may include the following sub-steps:

Sub-step S1: The provisioner determines a spectrum hopping channel set based on the BLE channel spectrum distribution information and the wireless network frequency data.

The spectrum hopping channel (Channel Map) set includes 37 hopping channels, categorized into available channels and unavailable channels.

In the present disclosure, in a scenario where the wireless network frequency data is 2.427 to 2.477, according to the channel spectrum distribution of BLE, it can be determined that the spectrum hopping channel set need to avoid channels on 2.426 to 2.448 GHz.

Sub-step S2: The provisioner determines a set of to-be-processed hopping channels based on the spectrum hopping channel set.

In the present disclosure, the specific implementation process of step S2 can include the following steps: the provisioner converts each spectrum hopping channel value in the spectrum hopping channel set into a corresponding BLE channel value, to obtain a BLE channel set; the provisioner determines, in the BLE channel set, to-be-processed hopping channel values that satisfy the correspondence between BLE frequency values and channels, to obtain the set of to-be-processed hopping channels.

For example, in the scenario where the wireless network frequency data is 2.427 to 2.477, according to the channel spectrum distribution of BLE, it can be determined that the spectrum hopping channel set needs to avoid channels on 2.426 to 2.448 GHz. The corresponding BLE channels, which are channels 11 to 21, need to be blocked. In other words, the BLE channel set is 11 to 21. Referring to FIG. 7, since channels 37, 38, and 39 are broadcast channels for BLE, which are not part of the correspondence between BLE frequency values and channels, channel 38 does not need to be processed.

Sub-step S3: The provisioner determines, based on a correspondence between BLE frequency values and channels, a target hopping channel value corresponding to each to-be-processed hopping channel value in the set of to-be-processed hopping channels.

For example, referring to FIG. 7, since channels 37, 38, and 39 are broadcast channels for BLE and are not part of the correspondence between BLE frequency values and channels, it is unnecessary to process channel 38. For the connection request, 37 bits are used to correspond to channels 0 to 36. The first four bytes each contain 8 bits that are valid. The fifth byte has 5 valid bits. With reference to the channel distribution shown in FIG. 7, the corresponding hopping channel values are 0xff, 0x07, 0xc0, 0xff, and 0x1f. In other words, the corresponding target hopping channel values are: 0xff, 0x07, 0xc0, 0xff, and 0x1f.

Step 205: After the to-be-connected device receives a connection request sent by the provisioner and sets the target hopping channel value as a to-be-connected device hopping value, the provisioner controls the to-be-connected device to hop at a frequency corresponding to the to-be-connected device hopping value to complete interaction of provisioning data packets.

In the present disclosure, referring to FIG. 4, when the BLE module 022 in the provisioner 02 establishes the BLE connection with the to-be-connected device 03, the provisioner can configure hopping channel content in the connection request. In the hopping channel, the target hopping channel value corresponding to the current wireless access point information can be configured as unavailable. After the to-be-connected device receives the connection request, the target hopping channel value can be set as the to-be-connected device hopping value. During the entire mesh provisioning phase, data interaction can be conducted while avoiding the target hopping channel of the current wireless access point corresponding to the wireless module. The BLE data transmission remains unaffected by interference from the wireless network. There is no need to retransmit data, thereby increasing the provisioning success rate and the provisioning speed.

For example, referring to FIG. 7, since channels 37, 38, and 39 are broadcast channels for BLE and are not part of the correspondence between BLE frequency values and channels, it is unnecessary to process channel 38. For the connection request, 37 bits are used to correspond to channels 0 to 36. The first four bytes each contain 8 bits that are valid. The fifth byte has 5 valid bits. With reference to the channel distribution shown in FIG. 7, the corresponding hopping channel values are 0xff, 0x07, 0xc0, 0xff, and 0x1f. In other words, the corresponding target hopping channel values are: 0xff, 0x07, 0xc0, 0xff, and 0x1f. When the to-be-connected device receives a connection request sent by the provisioner, the to-be-connected device sets the target hopping channel value to as the to-be-connected device hopping value. Subsequently, the provisioner controls the to-be-connected device to perform hopping on the frequency corresponding to the to-be-connected device hopping value, to complete the entire data packet exchange for BLE mesh provisioning. In this way, the data interaction between the provisioner and the to-be-connected device occurs on a different frequency channel from the one used by the current wireless module. In other words, the data interaction takes place on a clean channel, minimizing conflicts in data transmitting and receiving and improving the success rate of data transmission.

In summary, in the BLE mesh-based provisioning control method provided by this embodiment of the present disclosure, during provisioning between the server and the provisioner and/or between the provisioner and the to-be-connected device, the provisioner completes, within one interval scheduling cycle based on a preset ratio of effective transmission time to interval, interactive transmission of at least three data packets sent by the server, which can increase the provisioning speed and reduce the data interaction time. During provisioning between the provisioner and the to-be-connected device, the provisioner obtains current wireless access point information. The provisioner determines a target hopping channel value based on the current wireless access point information. After the to-be-connected device receives a connection request sent by the provisioner and sets the target hopping channel value as a to-be-connected device hopping value, the provisioner controls the to-be-connected device to hop at a frequency corresponding to the to-be-connected device hopping value to complete interaction of provisioning data packets. This approach ensures that the data interaction between the provisioner and the to-be-connected device takes place on a different frequency band from a wireless local area network corresponding to the current wireless access point information, thereby significantly reducing data transmission conflicts and improving the success rate of data transmission.

A BLE mesh-based provisioning control system provided by the present disclosure includes a server, a provisioner, and a to-be-connected device that are sequentially connected. The system can implement the BLE mesh-based provisioning control method shown in any one of FIG. 1 to FIG. 7. To avoid repetition, details are not described herein again.

In the embodiments of the present disclosure, the electronic device can be an apparatus, a component within a terminal, an integrated circuit, or a chip. The apparatus can be a mobile electronic device or a non-mobile electronic device. For example, the mobile electronic device may be a mobile phone, a tablet computer, a laptop computer, a handheld computer, an in-car electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), an automatic teller machine, a self-service machine, or the like. The mobile electronic device and the non-mobile electronic device are not specifically limited in the embodiments of the present disclosure.

The electronic device in the embodiments of the present disclosure can be an apparatus having an operating system. The operating system can be the Android operating system, the iOS operating system, or other possible operating systems, which are not specifically limited in the embodiments of the present disclosure.

Figure 8:
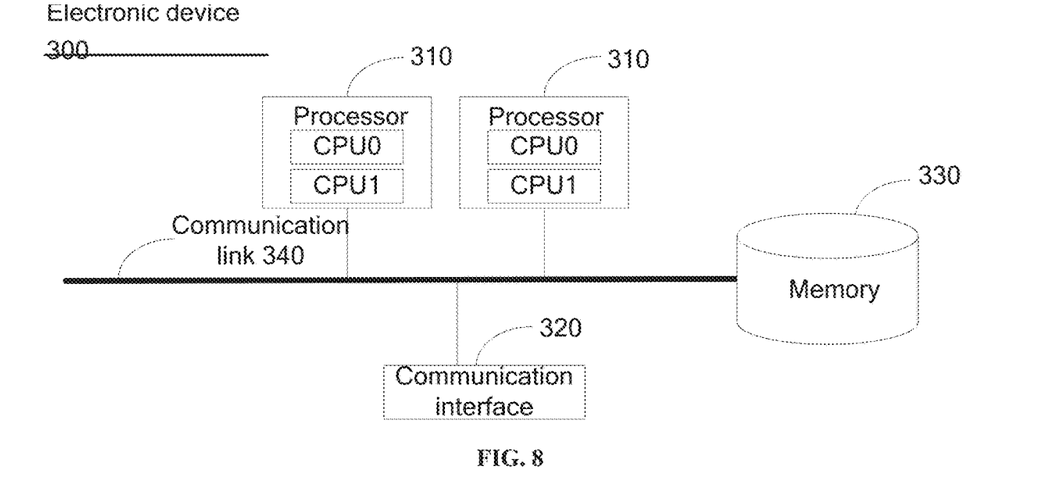
FIG. 8 is a schematic diagram of a hardware structure of an electronic device according to an embodiment of the present disclosure.

FIG. 8 is a schematic diagram of a hardware structure of an electronic device according to an embodiment of the present disclosure. As shown in FIG. 8, the electronic device 300 includes a processor 310.

As shown in FIG. 8, the processor 310 may be a central processing unit (CPU), a microprocessor, an application-specific integrated circuit (ASIC), or one or more integrated circuits for controlling the execution of the program corresponding to the solution of the present disclosure.

As shown in FIG. 8, the electronic device 300 may further include a communication link 340. The communication link 340 may include a channel for transmitting information between the components.

Optionally, as shown in FIG. 8, the electronic device may further include a communication interface 320. There may be one or more communication interfaces 320. The communication interface 320 can employ devices such as transceivers to facilitate communication with other devices or communication networks.

Optionally, as shown in FIG. 8, the electronic device may further include a memory 330. The memory 330 is configured to store computer-executable instructions corresponding to the solution of the present disclosure, where the instructions are executed by the processor. The processor is configured to execute the computer-executable instructions stored in the memory, to implement the method provided by the embodiments of the present disclosure.

As shown in FIG. 8, the memory 330 may be, but is not limited to, a read-only memory (ROM) or other types of static storage devices that can store static information and instructions, a random access memory (RAM) or other types of dynamic storage devices that can store information and instructions, an electrically erasable programmable read-only memory (EEPROM), a compact disc read-only memory (CD-ROM) or other optical disc storage, an optical disc storage (including a compact disc, a laser disc, an optical disc, a digital versatile disc, or a Blu ray disc), a disk storage medium or other magnetic storage devices, or any other medium that can be used to carry or store desired program code in a form of an instruction or a data structure and can be accessed by a computer. The memory 330 may exist independently or connected to the processor 310 through the communication link 340. Alternatively, the memory 330 may be integrated with the processor 310.

Optionally, the computer-executable instructions in the embodiments of the present disclosure can also be referred to as application program code, which is not specifically limited in the embodiments of the present disclosure.

In specific implementation, in an embodiment, as shown in FIG. 8, the processor 310 may include one or more CPUs, such as CPU0 and CPU1 in FIG. 8.

In specific implementation, in an embodiment, as shown in FIG. 8, the terminal device may include a plurality of processors, such as the processors in FIG. 8. Each of these processors can be a single-core processor or a multi-core processor.

Figure 9:
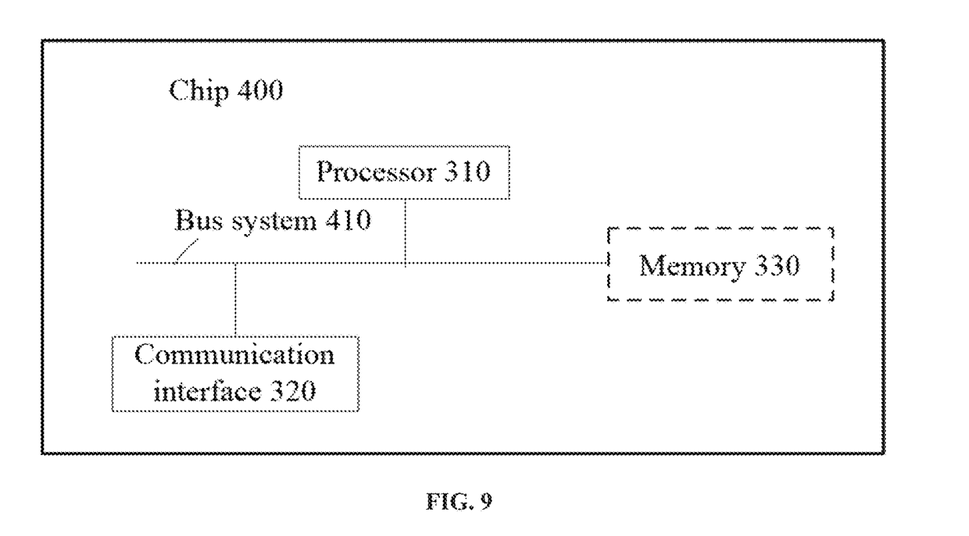
FIG. 9 is a schematic structural diagram of a chip according to an embodiment of the present disclosure.

FIG. 9 is a schematic structural diagram of a chip according to an embodiment of the present disclosure. Are as shown in FIG. 9, the chip 400 includes one or more than two (including two) processors 310.

Optionally, as shown in FIG. 9, the chip further includes a communication interface 320 and a memory 330. The memory 330 may include a ROM and a RAM, and provide operation instructions and data to the processor. A part of the memory may further include a non-volatile random-access memory (NVRAM).

In some implementations, as shown in FIG. 9, the memory 330 stores the following elements: executable modules or data structures, or their subsets, or their extension sets.

In the embodiments of the present disclosure, as shown in FIG. 9, a corresponding operation is performed by calling the operation instruction stored in the memory (the operation memory may be stored in the operating system).

As shown in FIG. 9, the processor 310 controls any one of processing operations in the terminal device. The processor 310 can also be referred to as a CPU.

As shown in FIG. 9, the memory 330 may include a ROM and a RAM, and can provide instructions and data to the processor. A part of the memory 330 may further include an NVRAM. For example, the memory, communication interface, and memory are coupled together through a bus system in an application. In addition to a data bus, the bus system may further include a power bus, a control bus, and a status signal bus. However, for clarity, various buses are denoted as the bus system 410 in FIG. 9.

As shown in FIG. 9, the method disclosed in the embodiments of the present disclosure can be applied to the processor or implemented by the processor. The processor may be an integrated circuit (IC) chip capable of signal processing. During the implementation, the steps of each method may be performed through an integrated logic circuit of hardware in a processor or through instructions in the form of software. The processor may be a general-purpose processor, a digital signal processor (DSP), an application-specific integrated circuit (ASIC), a field-programmable gate array (FPGA), another programmable logic device, a discrete gate or transistor logic device, or a discrete hardware component. The processor can implement or execute the methods, steps and logical block diagrams disclosed in embodiments of this application. The general-purpose processor may be a microprocessor, or the processor may be any conventional processor or the like. The steps of the methods disclosed with reference to embodiments of this application may be directly executed by a hardware decoding processor, or executed by a combination of hardware and software modules in the decoding processor. The software module may be located in a mature storage medium in the art, such as a random access memory (RAM), a flash memory, a read-only memory, a programmable read-only memory (ROM), an electrically erasable programmable memory, or a register. The storage medium is located in a memory. The processor reads information in the memory, and completes the operations of the foregoing methods in combination with hardware in the processor.

In one aspect, a computer-readable storage medium is provided. The computer-readable storage medium stores instructions, and when being run, the instructions implement functions executed by the terminal device in the foregoing embodiments.

In one aspect, a chip is provided. The chip is applied to a terminal device and includes at least one processor and a communication interface. The communication interface is coupled to the at least one processor. The processor is configured to run instructions to implement the BLE mesh-based provisioning control method in the foregoing embodiments.

Some or all of the functions in the foregoing embodiments may be implemented by software, hardware, firmware, or any combination thereof. When software is used for implementation, the implementation can be performed in a form of a computer program product in whole or in part. The computer program product includes one or more computer programs or instructions. When the computer programs or instructions are loaded and executed on a computer, the procedures or functions according to the embodiments of the present disclosure are achieved in whole or in part. The computer may be a general-purpose computer, a dedicated computer, a computer network, a terminal, a user equipment, or another programmable apparatus. The computer programs or instructions may be stored in a computer-readable storage medium or may be sent from a computer-readable storage medium to another computer-readable storage medium. For example, the computer programs or instructions may be sent from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Video Disc (DVD), a semiconductor medium (for example, a Solid State Disk (SSD)), or the like.

Although the present disclosure has been described in combination with the embodiments, those skilled in the art may understand and implement other changes of the embodiments of the present disclosure by checking the accompanying drawings, disclosures and appended claims during implementation of the present disclosure. In the claims, the word "comprising" does not exclude other components or step, and the word "a" or "an" does not exclude a plural cases. A single processor or other units may implement a plurality of functions listed in the claims. Some measures are recorded in dependent claims that are different from one another. However, it does not mean that these measure cannot be combined together to achieve a desirable effect.

Although the present disclosure has been described in combination with specific features and embodiments thereof, it is apparent that various modifications and combinations may be made without departing from the spirit and scope of the present disclosure. Correspondingly, the specification and accompanying drawings are merely exemplary descriptions of the present disclosure that are defined by the appended claims, and are deemed as covering any and all of the modifications, changes, combinations or equivalents within the scope of the present disclosure. Apparently, a person skilled in the art can make various changes and modifications to this application without departing from the spirit and scope of this application. This application is intended to cover these modifications and variations provided that they fall within the scope of the claims of the present application and their equivalent technologies.

What is claimed is:

1. A Bluetooth Low Energy (BLE) mesh-based provisioning control method, applied to a BLE mesh-based provisioning control system comprising a server, a provisioner, and a to-be-connected device that are sequentially connected, wherein the method comprises:
   during provisioning between the server and the provisioner and/or between the provisioner and the to-be-connected device, completing, by the provisioner within one interval scheduling cycle based on a preset ratio of effective transmission time to interval, interactive transmission of at least three data packets sent by the server;
   obtaining, by the provisioner, current wireless access point information during provisioning between the provisioner and the to-be-connected device;
   determining, by the provisioner, a target hopping channel value based on the current wireless access point information; and
   after the to-be-connected device receiving a connection request sent by the provisioner and setting the target hopping channel value as a to-be-connected device hopping value, controlling, by the provisioner, the to-be-connected device to hop at a frequency corresponding to the to-be-connected device hopping value to complete interaction of provisioning data packets.

2. The BLE mesh-based provisioning control method according to claim 1, wherein said determining, by the provisioner, a target hopping channel value based on the current wireless access point information comprises:
   determining, by the provisioner, wireless network frequency data based on the current wireless access point information; and
   determining, by the provisioner, the target hopping channel value based on BLE channel spectrum distribution information and the wireless network frequency data.

3. The BLE mesh-based provisioning control method according to claim 2, wherein said determining, by the provisioner, the target hopping channel value based on BLE channel spectrum distribution information and the wireless network frequency data comprises:
   determining, by the provisioner, a spectrum hopping channel set based on the BLE channel spectrum distribution information and the wireless network frequency data;
   determining, by the provisioner, a set of to-be-processed hopping channels based on the spectrum hopping channel set; and
   determining, by the provisioner based on a correspondence between BLE frequency values and channels, a target hopping channel value corresponding to each to-be-processed hopping channel value in the set of to-be-processed hopping channels.

4. The BLE mesh-based provisioning control method according to claim 3, wherein said determining, by the provisioner, a set of to-be-processed hopping channels based on the spectrum hopping channel set comprises:
   converting, by the provisioner, each spectrum hopping channel value in the spectrum hopping channel set into a BLE channel value, to obtain a BLE channel set; and
   determining, by the provisioner, in the BLE channel set, to-be-processed hopping channel values that satisfy the correspondence between BLE frequency values and channels, to obtain the set of to-be-processed hopping channels.

5. The BLE mesh-based provisioning control method according to claim 1, wherein said obtaining, by the provisioner, current wireless access point information during provisioning between the provisioner and the to-be-connected device comprises:
   during provisioning between the provisioner and the to-be-connected device, obtaining, by the provisioner, a node of the to-be-connected device, and initiating a BLE connection; and
   obtaining, by the provisioner, the current wireless access point information.

6. An electronic device, comprising one or more processors, and one or more machine-readable media storing instructions, wherein when the instructions are executed by the one or more processors, the BLE mesh-based provisioning control method according to claim 1 is implemented.

7. A Bluetooth Low Energy (BLE) mesh-based provisioning control system, comprising a server, a provisioner, and a to-be-connected device that are sequentially connected,
   wherein during provisioning between the server and the provisioner and/or between the provisioner and the to-be-connected device, the provisioner is configured to complete, within one interval scheduling cycle based on a preset ratio of effective transmission time to interval, interactive transmission of at least three data packets sent by the server;

during provisioning between the provisioner and the to-be-connected device, the provisioner is configured to obtain current wireless access point information;

the provisioner is further configured to determine a target hopping channel value based on the current wireless access point information; and after the to-be-connected device receiving a connection request sent by the provisioner and setting the target hopping channel value as a to-be-connected device hopping value, the provisioner is configured to control the to-be-connected device to hop at a frequency corresponding to the to-be-connected device hopping value to complete interaction of provisioning data packets.

8. The BLE mesh-based provisioning control system according to claim 7, wherein the provisioner is further configured to determine a target hopping channel value based on the current wireless access point information, specifically:

the provisioner is configured to determine wireless network frequency data based on the current wireless access point information; and the provisioner is further configured to determine the target hopping channel value based on BLE channel spectrum distribution information.

9. The BLE mesh-based provisioning control system according to claim 8, wherein the provisioner is further configured to determine the target hopping channel value based on BLE channel spectrum distribution information, specifically:

the provisioner is configured to determine a spectrum hopping channel set based on the BLE channel spectrum distribution information;

the provisioner is configured to determine a set of to-be-processed hopping channels based on the spectrum hopping channel set; and the provisioner is configured to determine, based on a correspondence between BLE frequency values and channels, a target hopping channel value corresponding to each to-be-processed hopping channel value in the set of to-be-processed hopping channels.

10. The BLE mesh-based provisioning control system according to claim 9, wherein the provisioner is configured to determine a set of to-be-processed hopping channels based on the spectrum hopping channel set, specifically:

the provisioner is configured to convert each spectrum hopping channel value in the spectrum hopping channel set into a BLE channel value, to obtain a BLE channel set; and the provisioner is configured to determine, in the BLE channel set, to-be-processed hopping channel values that satisfy the correspondence between BLE frequency values and channels, to obtain the set of to-be-processed hopping channels.

* * * * *